(12) United States Patent
Bertram et al.

(10) Patent No.: US 7,814,493 B2
(45) Date of Patent: Oct. 12, 2010

(54) RESOURCE PRESENTATION CONVERGENCE

(75) Inventors: Randall Lee Bertram, Raleigh, NC (US); Gregory Richard Hintermeister, Rochester, MN (US); Michael D. Rahn, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1461 days.

(21) Appl. No.: 11/201,975

(22) Filed: Aug. 11, 2005

(65) Prior Publication Data

US 2007/0038959 A1    Feb. 15, 2007

(51) Int. Cl.
G06F 9/46 (2006.01)

(52) U.S. Cl. .................. 718/104; 718/100; 718/106

(58) Field of Classification Search .............. 718/100, 718/101, 104, 106; 705/39
See application file for complete search history.

(56) References Cited

U.S. PATENT DOCUMENTS

| | | | |
|---|---|---|---|
| 5,826,237 A * | 10/1998 | Macrae et al. ............... 705/2 |
| 6,389,433 B1 * | 5/2002 | Bolosky et al. ............ 707/749 |
| 2005/0154615 A1 * | 7/2005 | Rotter et al. ................ 705/3 |
| 2005/0246269 A1 * | 11/2005 | Smith ......................... 705/39 |
| 2006/0242444 A1 * | 10/2006 | Novik et al. ............... 713/400 |

* cited by examiner

Primary Examiner—Meng-Ai An
Assistant Examiner—Willy W Huaracha
(74) Attorney, Agent, or Firm—Owen J. Gamon

(57) ABSTRACT

A method, apparatus, system, and signal-bearing medium that, in an embodiment, find duplicate resource identifiers that originate from different applications, converge the duplicate resource identifiers into a converged interface object, and present the converged interface object. The duplicate resource identifiers identify the same resource, and the different applications manage the same resource. Duplicate links associated with the duplicate resource identifiers are found, where the duplicate links originate from different applications, and the duplicate links are converged into a converged interface object. The duplicate links provide information regarding the same resource. Duplicate task identifiers are found that are associated with the duplicate resource identifiers and that originate from the different applications. The duplicate task identifiers are converged into a converged interface object. The duplicate task identifiers identify tasks that are performed by the different applications via the same resource. In an embodiment, the duplicate resource identifiers and duplicate task identifiers may be found based on a convergence level. Invocation options are presented for the different applications in response to selection of the converged interface object. A most critical status associated with the duplicate resource identifiers is determined and presented.

14 Claims, 5 Drawing Sheets

| RESOURCE DATA | | | | | | 168 | |
|---|---|---|---|---|---|---|---|
| RESOURCE ID (450) | APP ID (455) | DRILL DOWN DATA (460) | TASKS (465) | TASK META DATA (470) | STATUS (475) | REL (480) | |
| SYSTEM A | APP A | JOBS MESSAGES | COLLECT INVENTORY VIEW FIXES | | OK | | 405 |
| MONITOR A | APP A | SYSTEM A SYSTEM B | VIEW WORKLOAD | | OK | | 410 |
| MONITOR B | APP A | SYSTEM C SYSTEM D | | | OK | | 415 |
| SYSTEM A | APP B | DISK UNITS MESSAGES | COLLECT INVENTORY MANAGE HARDWARE | | OK | | 420 |
| MONITOR A | APP B | SYSTEM C SYSTEM D | VIEW WORKLOAD | | OK | | 425 |
| MONITOR B | APP B | SYSTEM E SYSTEM F | | | LAN DOWN | | 430 |
| SYSTEM A | APP C | EVENTS MESSAGES | INSTALL SOFTWARE CREATE USERS | | OK | | 435 |
| MONITOR A | APP C | SYSTEM E SYSTEM F | VIEW WORKLOAD | | OK | | 440 |
| MONITOR B | APP C | SYSTEM F SYSTEM G | | | LOW TONER | | 445 |

FIG. 4

RESOURCE PRESENTATION CONVERGENCE

FIELD

This invention generally relates to computer systems and more specifically relates to converging the presentation of computer resources.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Today's more powerful computers are often connected in networks, and a user at one computer, often called a client, may wish to access information at multiple other computers, often called servers, via a network. The network may be a local network that connects computers associated with the same company, e.g., a LAN (Local Area Network), or it may be an external network, such as the Internet or World Wide Web, that connects computers from disparate users and companies. Further, the network may be a combination of local and external networks. Companies typically have multiple computers containing different hardware and software packages, often generically referred to as resources, attached to these networks.

Managing the resources of multiple computers attached to networks is a difficult task. To aid the system administrator with this task, management software is available that manages installing, deploying, and maintaining resources in a complex heterogeneous networked environment. This software typically provides a "console" from which resources of a network of computers may be managed. The console typically receives information regarding the resources from a variety of applications that manage the resources and presents the information in a user interface.

The console typically represents the resources in the user interface as belonging to particular classes or categories, e.g., servers, monitors, messages, databases, jobs, printers, storage devices, processors, or any hardware, software, data, or combination thereof. Each resource has specific logical operations or tasks that can be performed against it, such as powering on or off a server, executing a command, collecting inventory, installing software, configuring the network, scheduling jobs, applying patches, viewing fixes, creating users, or viewing and monitoring the usage and performance of resources, among other functions. Each resource may have associated drill-down data, which provides additional information about the resource, typically via links, which contain addresses of the additional information, wherever it may be in the network.

Hence, the console typically receives information from the various applications in the form of resource identifiers, links, and task identifiers and presents this information via a user interface. Unfortunately, multiple applications may manage the same resource, so the multiple applications may provide not only duplicate resource identifiers, but duplicate links and duplicate task identifiers as well. This duplicate information can clutter the display screen and present a confusing interface for the user. This problem may be exacerbated when the applications that provide the information to the console were written by different third-party vendors, who did not necessarily coordinate their efforts to provide consistent information.

Thus, a need exists for an improved technique to handle duplicate information received from applications regarding resources.

SUMMARY

A method, apparatus, system, and signal-bearing medium are provided that, in an embodiment, find duplicate resource identifiers that originate from different applications, converge the duplicate resource identifiers into a converged interface object, and present the converged interface object. The duplicate resource identifiers identify the same resource, and the different applications manage the same resource. Duplicate links associated with the duplicate resource identifiers are found, where the duplicate links originate from different applications, and the duplicate links are converged into a converged interface object. The duplicate links provide information regarding the same resource. Duplicate task identifiers are found that are associated with the duplicate resource identifiers and that originate from the different applications. The duplicate task identifiers are converged into a converged interface object. The duplicate task identifiers identify tasks that are performed by the different applications via the same resource. In an embodiment, the duplicate resource identifiers and duplicate task identifiers may be found based on a convergence level. Invocation options are presented for the different applications in response to selection of the converged interface object. A most critical status associated with the duplicate resource identifiers is determined and presented.

BRIEF DESCRIPTION OF THE DRAWINGS

Various embodiments of the present invention are hereinafter described in conjunction with the appended drawings:

FIG. 4 depicts a block diagram of example resource data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a resource convergence manager receives information about resources from applications that manage the resources. The information may include resource identifiers that identify the resources, status regarding the resources, drill-down data with links to additional information regarding the resources, and task identifiers that identify tasks that the applications perform via the resources. Some or all of the applications may manage the same resource or resources, so some or all of the received resource identifiers, links, and task identifiers may be duplicates. The resource convergence manager finds the duplicates and converges them into converged interface objects, which the resource convergence manager presents via a user interface. The resource convergence manager further chooses and presents the most critical status associated with the resources and provides invocation options for choosing between the applications that execute the tasks.

Figure 1:
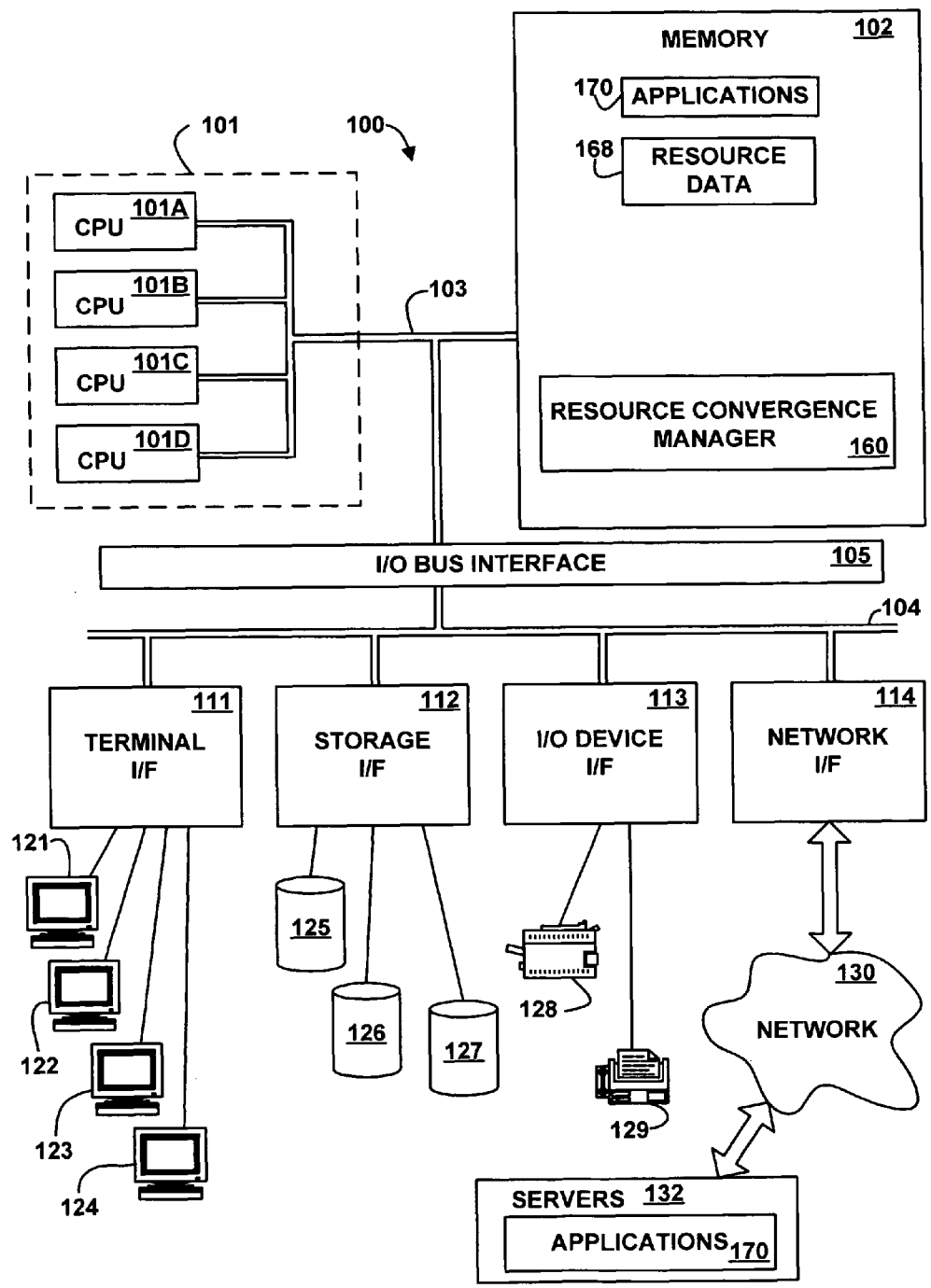
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to servers 132, according to an embodiment of the present invention. The terms "computer" and "server" are used for convenience only, and an electronic device that acts as a server in one embodiment may act as a client in another embodiment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a resource convergence manager 160, resource data 168, and applications 170. Although the resource convergence manager 160, the resource data 168, and the applications 170 are illustrated as being contained within the memory 102 in the computer system 100, in other embodiments some or all of them may be on different computer systems (for example, the servers 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the resource convergence manager 160, the resource data 168, and the applications 170 are illustrated as being contained within the main memory 102, these elements are not necessarily all completely contained in the same storage device at the same time. Further, although the resource convergence manager 160, the resource data 168, and the applications 170 are illustrated as being separate entities, in other embodiments some of them, or portions of some of them, may be packaged together.

The resource convergence manager 160 receives information regarding resources from the applications 170, creates the resource data 168 based on the received information, and converges the resource data 168 for presentation. In various embodiments, the applications 170 may be user applications, third party applications, operating systems, or any combination or portion thereof. Examples of the applications 170 include Operations Navigator, WebSM, and IBM Director, all available from International Business Machines Corporation, but in other embodiment any application that is capable of providing information about resources may be used.

In various embodiments, resources may be computer systems, clusters of computer systems, monitors (programs that monitor other resources for status), storage devices, memory, databases, routers, networks, input devices, output devices, I/O controllers, servers, messages, databases, jobs, printers, processors, or any hardware, software, data, or combination or multiple thereof. A resource may have a hierarchy of sub-resources, which are also resources. For example, a computer system resource may include a processor and memory, which are sub-resources of the computer system resource.

The presentation and convergence of the resource data 168 by the resource convergence manager 160 in user interfaces is further described below with reference to FIGS. 2A, 2B, 3A, and 3B. The resource data 168 is further described below with reference to FIG. 4. The resource convergence manager 160 includes instructions capable of executing on the processor 101 or statements capable of being interpreted by instructions executing on the processor 101 to perform the functions as further described below with reference to FIG. 5. In another embodiment, the resource convergence manager 160 may be implemented in microcode or firmware. In another embodiment, the resource convergence manager 160 may be implemented in hardware via logic gates and/or other appropriate hardware techniques in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The servers 132 may include some or all of the hardware and/or software elements previously described above for the computer system 100. The servers 132 may further include some or all of the applications 170. In another embodiment, the servers 132 are optional, not present, or not used.

It should be understood that FIG. 1 is intended to depict the representative major components of the computer system 100, the network 130, and the servers 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100, via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

The tangible signal-bearing media may be operatively connected (directly or indirectly) to a processing unit, such as the processor 101. Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
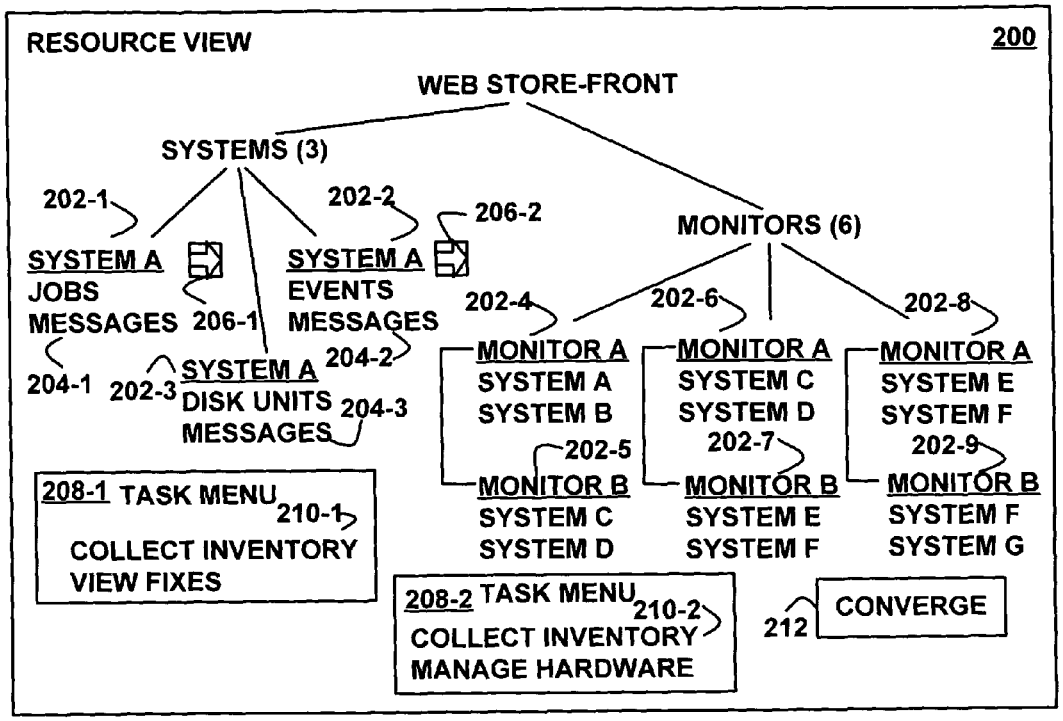
FIG. 2A depicts a block diagram of an example user interface for a resource view, according to an embodiment of the invention.

FIG. 2A depicts a block diagram of an example user interface 200 for a resource view, according to an embodiment of the invention. The resource convergence manager 160 presents the user interface 200 via a display on the terminals 121, 122, 123, and/or 124 (FIG. 1), via audio on an unillustrated speaker, or via any other appropriate interface device. The user interface 200 includes resource identifiers 202-1, 202-2, 202-3, 202-4, 202-5, 202-6, 202-7, 202-8, and 202-9. Some of the resource identifiers are duplicates, e.g., the resource identifiers 202-1, 202-2, and 202-3 all are named "System A," the resource identifiers 202-4, 202-6, and 202-8 are all named "Monitor A," and the resource identifiers 202-5, 202-7, and 202-9 are all named "Monitor B."

The resource identifiers 202-1, 202-2, 202-3, 202-4, 202-5, 202-6, 202-7, 202-8, and 202-9 may have associated drill-down data, which may include links to additional information regarding the resources or regarding sub-resources associated with the resources. In response to the links being selected, the resource convergence manager 160 provides information regarding the sub-resource or the resource. For example, the resource identifier 202-1 has associated drill-down data that includes an example link 204-1, the resource identifier 202-2 has associated drill-down data that includes an example link 204-2, and the resource identifier 202-3 has associated drill-down data that includes an example link 204-3. The links 204-1, 204-2, and 204-3 are duplicate links that refer to the same sub-resource of the same resource, in this example the "messages" sub-resource of the "System A" resource.

The user interface 200 further includes task-menu icons 206-1 and 206-2, associated with respective resource identifiers 202-1 and 202-2. In response to selection of a task-menu icon, the convergence manager 160 presents a task menu that identifies tasks that are capable of being performed by the associated application via the resource. For example, in response to selection of the task-menu icon 206-1, the resource convergence manager 160 presents the task menu 208-1, which includes the task identifier 210-1, which is a "collect inventory" task; and in response to selection of the task-menu icon 206-2, the resource convergence manager 160 presents the task menu 208-2, which includes the task identifier 210-2, which is also a "collect inventory" task. The task identifiers 210-1 and 210-2 are duplicate task identifiers that refer to tasks performed by different applications via the same resource identified by the duplicate resource identifiers 202-1 and 202-2. Since the tasks referred to by the duplicate task identifiers 210-1 and 210-2 are performed by different applications, the tasks may provide similar functions that are not necessarily identical.

The user interface 200 further includes a converge button 212, which in response to being selected causes the resource convergence manager 160 to create the user interface as further described below with reference to FIG. 2B and to perform the processing as further described below with reference to FIG. 5. In another embodiment, the converge button 212 operates only on selected of the duplicate resource identifiers, duplicate links, and/or duplicate task identifiers, so that some of the duplicate resource identifiers, links and/or task identifiers may be converged while others are not. In another embodiment, the converge button 212 is not present, optional, or not used, and the resource convergence manager 160 performs its functions automatically without needing an explicit request.

Figure 2B:
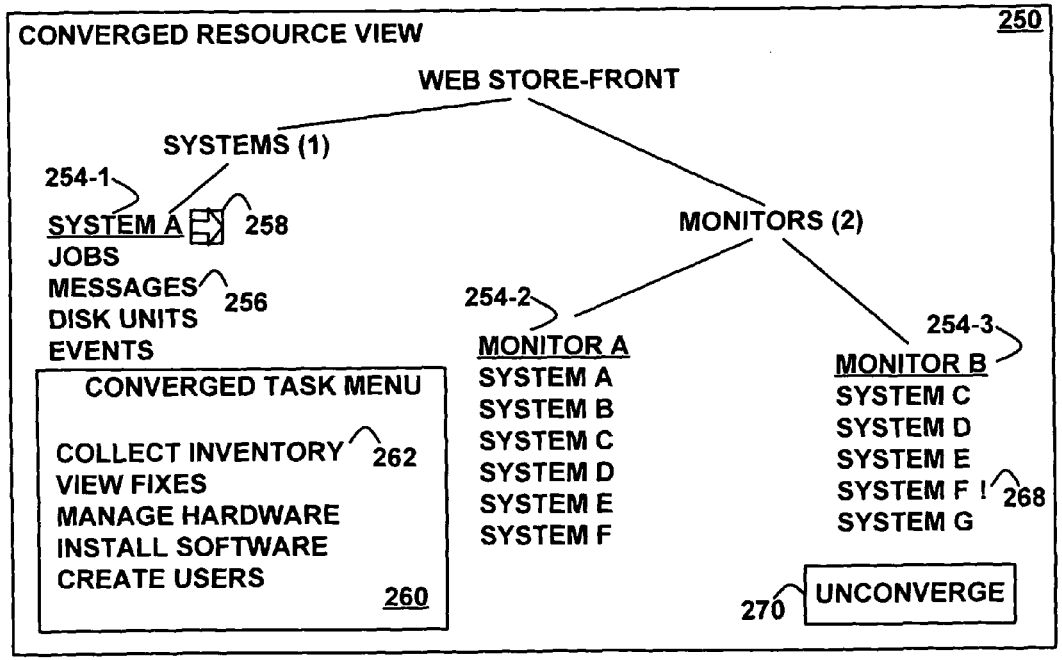
FIG. 2B depicts a block diagram of an example user interface for a converged resource view, according to an embodiment of the invention.

FIG. 2B depicts a block diagram of an example user interface 250 for a converged resource view, according to an embodiment of the invention. The user interface 250 may be presented via the terminals 121, 122, 123, and/or 124 (FIG. 1), a speaker, or via any other appropriate interface device. The user interface 250 includes converged interface objects 254-1, 254-2, 254-3. The converged interface object 254-1 represents the duplicate resource identifiers 202-1, 202-2, and 202-3. The converged interface object 254-2 represents the duplicate resource identifiers 202-4, 202-6, and 202-8. The converged interface object 254-3 represents the duplicate resource identifiers 202-5, 202-7, and 202-9. A converged interface object represents duplicate resource identifiers in the sense that the resource convergence manager presents only one of the represented duplicate resource identifiers and, in response to selection of the converged interface object, the resource convergence manager presents another converged interface object that represents converged drill-down data associated with all of the represented duplicate resource identifiers. Hence, the user interface 250 further includes converged interface objects that represent duplicate links in drill-down data, such as the converged interface object 256, which represents the duplicate links 204-1, 204-2, and 204-3. The converged interface object 256 represents the duplicate links 204-1, 204-2, and 204-3 in the sense that, in response to selection of the converged interface object 256, the resource convergence manager 160 retrieves the linked information for only one of the duplicate links, in various embodiments by choosing one of the duplicate links or by prompting the user to choose one of the links.

The user interface 250 further includes a converged interface object 268, which represents the status for duplicate resources. The resource convergence manager 160 determines a most critical (or most important) status identifier from among status identifiers associated with the duplicate resource identifiers and presents the most critical status identifier via the converged interface object 268. Although an exclamation mark "!" is illustrated for the converged interface object 268, any appropriate icon, a text message describing the status, such as an error, a condition, or an event needing action or attention may be used. In an embodiment, the resource convergence manager 160 may provide further information regarding the status in response to selection of the converged interface object 268, but in other embodiments, the converged interface object 268 may present all of the status information available.

The user interface 250 further includes a converged task-menu icon 258, which in response to selection causes the resource convergence manager 160 to present the converged task menu 260, which presents the task identifiers (e.g., the task identifier 262) associated with the converged interface object 254-1. The task identifier 262 is a converged interface object and represents the duplicate task identifiers 210-1 and 210-2. The converged task menu 260 is also a converged interface object and represents the convergence of the task identifiers for the tasks available for the applications 170 that manage the resource identified by the resource identifier "System A."

The user interface 250 further includes an unconverge button 270, which when selected requests the resource convergence manager 160 to separate some or all of the converged interface objects of the user interface 250 into the duplicate resource identifiers, the duplicate links, and/or the duplicate task identifiers. Thus, the unconverge button 270 requests the resource convergence manager 160 to reverse the operation of the converge button 212 (FIG. 2A) for some or all objects.

Figure 3A:
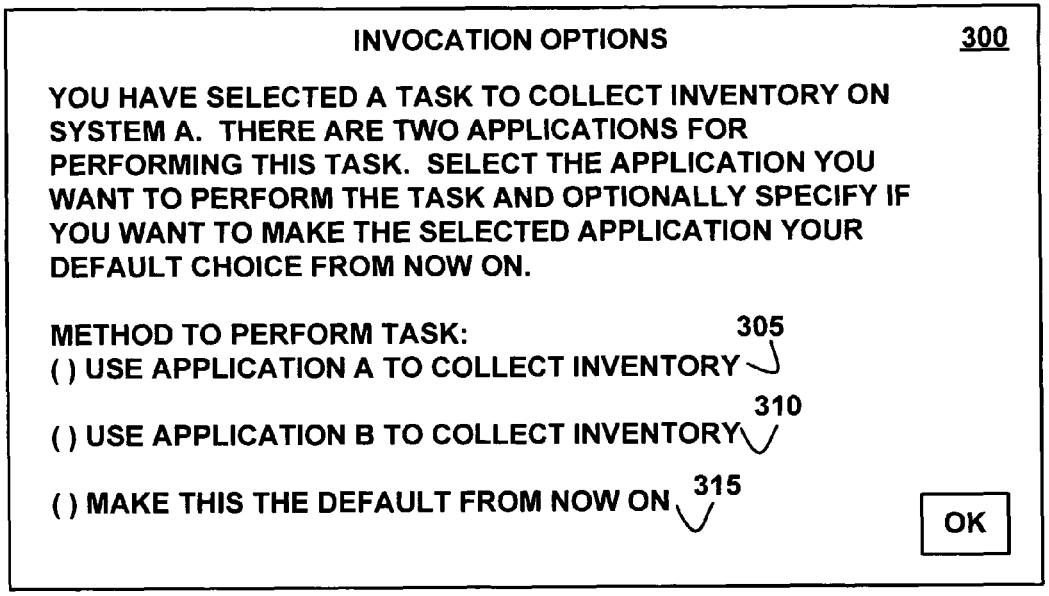
FIG. 3A depicts a block diagram of an example user interface of invocation options for selecting between multiple applications that perform a task, according to an embodiment of the invention.

FIG. 3A depicts a block diagram of an example user interface 300 of invocation options for selecting between multiple applications for performing a task, according to an embodiment of the invention. The user interface 300 may be presented via the terminals 121, 122, 123, and/or 124 (FIG. 1), a speaker, or via any other appropriate interface device.

The resource convergence manager 160 presents the user interface 300 in response to selection of a task identifier in a converged interface object (e.g., collect inventory 262 in the converged task menu 260 of FIG. 2B), where the converged interface object represents duplicate task identifiers (e.g., collect inventory 262 represents the duplicate task identifiers 210-1 and 210-2). Since the duplicate task identifiers 210-1 and 210-2 represent tasks performed by different applications 170, the resource convergence manager 160 presents the invocation options 305, 310, and 315, to allow the user to choose which of the applications 170 is to perform the task, in response to selection of the converged interface object 262. In the example of FIG. 3A, the user interface 300 includes an invocation option 305, which specifies that "Application A" (associated with the resource identifier 202-1) is to be invoked in response to selection of collect inventory 262. The user interface 300 further includes an invocation option 310, which specifies that "Application B" (associated with the resource identifier 202-2) is to be invoked in response to selection of collect inventory 262. Invocation option 315 requests that the resource convergence manager 160 use the selected invocation option 305 or 310 as the default in the future.

Although the invocation options of FIG. 3A have been illustrated in the context of duplicate task identifiers, in another embodiment, invocation options may be provided for duplicate links, so that in response to a selection of the converged interface object 256 (FIG. 2B) representing duplicate links, the resource convergence manager 160 presents invocation options that allow the user to choose from which linked location (the linked address associated with which of the applications 170) the resource convergence manager 160 should retrieve the additional linked information.

Figure 3B:
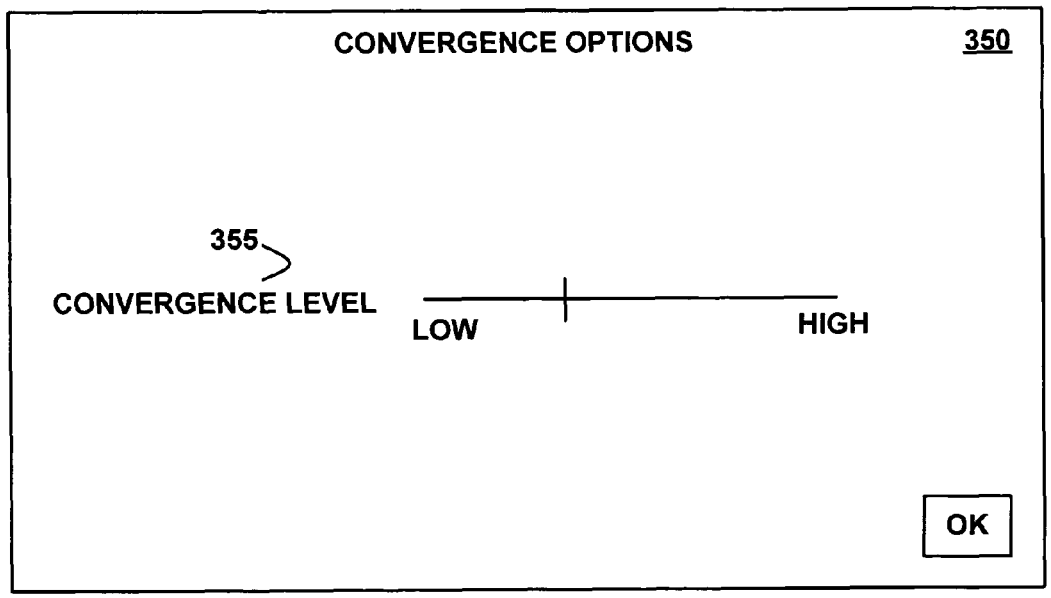
FIG. 3B depicts a block diagram of an example user interface of convergence level options, according to an embodiment of the invention.

FIG. 3B depicts a block diagram of an example user interface 350 of optional convergence level options 355, according to an embodiment of the invention. The convergence level options 355 allow the user to specify how exact a match the resource identifiers and/or tasks must be in order to be designated as duplicates. In an embodiment, if the convergence level 355 is specified toward the lower end of the range, the resource convergence manager 160 requires a higher level of commonality for objects to be considered duplicates (which results in a lower level of convergence); in contrast, if the convergence level 355 is specified toward the higher end of the range, the resource convergence manager 160 requires a lower level of commonality for objects to be considered duplicates (which results in a higher level of convergence). The user interface elements illustrated in FIG. 3B are examples only, and in other embodiments any appropriate user interface elements may be present.

FIG. 4 depicts a block diagram of a data structure for the example resource data 168, according to an embodiment of the invention. The example resource data 168 includes records 405, 410, 415, 420, 425, 430, 435, 440, and 445, but in other embodiments any number of records with any appropriate data may be present. Each of the records includes a resource identifier field 450, an application identifier field 455, a drill-down data field 460, a tasks field 465, a task meta-data field 470, a status field 475, and a relationship field 480 but in other embodiments more or fewer fields may be present.

The resource identifier field 450 identifies a resource that is managed by the application 170. The application identifier field 455 identifies the application 170 that manages the resource that is identified by the resource identifier field 450. The drill-down data field 460 identifies links that contain addresses of more information regarding the resource and/or sub-resources associated with the resource identified by the resource identifier 450. The tasks field 465 identifies tasks (e.g., operations or functions), which the application 170 identified by the application identifier field 455 is capable of performing via the resource identified by the resource identifier field 450. The task meta-data field 470 describes the functions or operations provided by the tasks 465. The status field 475 indicates the status of the resource identified by the resource identifier 450 and may include information about errors, unexpected or expected conditions, or events needing action or attention. The relationship field 480 describes any relationships between the resource identified by the resource identifier 450 of the current record and other resources identified in other records of the resource data 168. For example, one resource may uses the services of another resource or store data on another resource.

Figure 5:
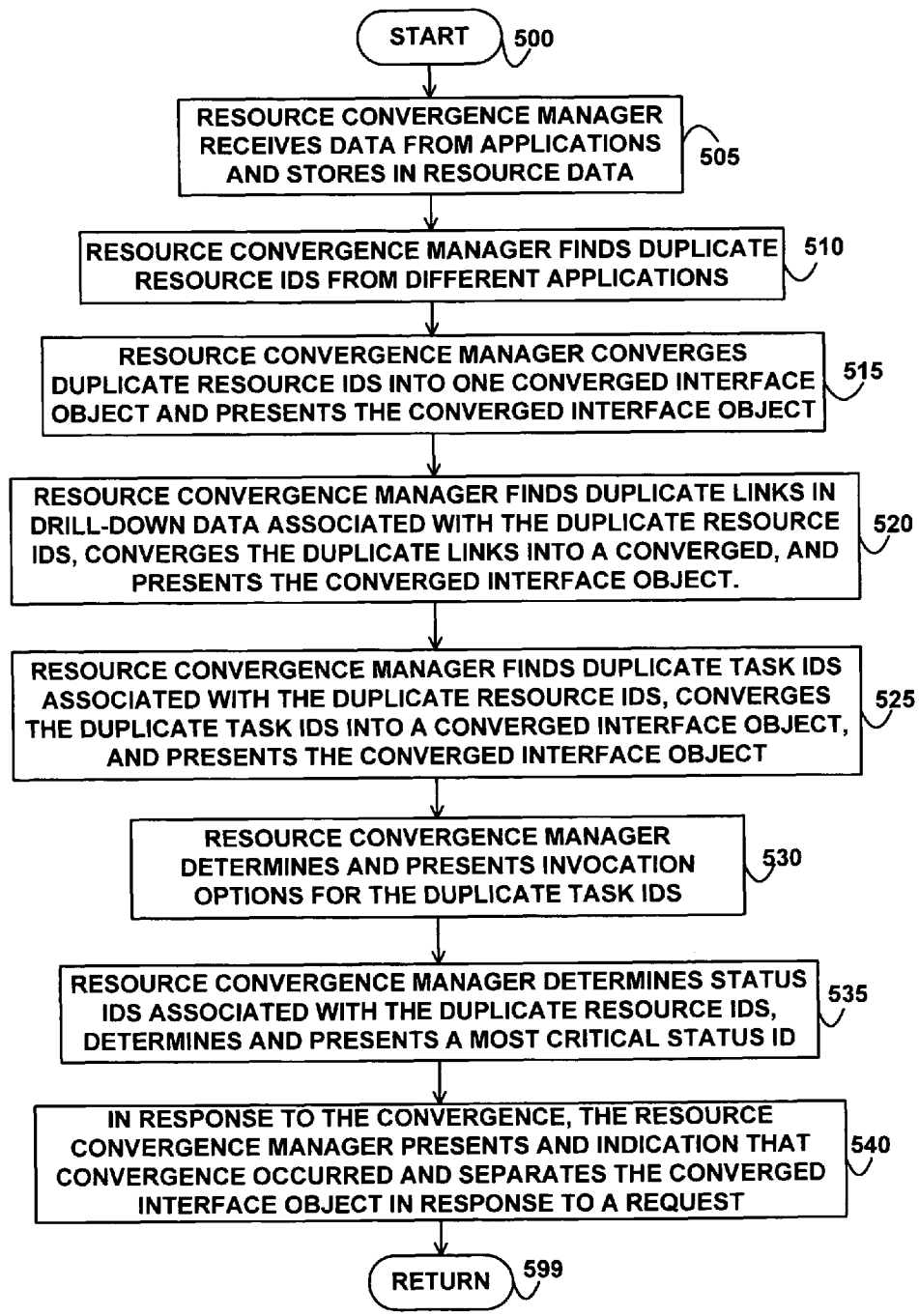
FIG. 5 depicts a flowchart of example processing for converging presentation of the resource data, according to an embodiment of the invention.

FIG. 5 depicts a flowchart of example processing for converging presentation of the resource data, according to an embodiment of the invention. Control begins at block 500. Control then continues to block 505 where the resource convergence manager 160 receives data from the applications 170 and stores the received data in the resource data 168.

Control then continues to block 510 where the resource convergence manager 160 finds duplicate resource identifiers 450 that originate from different applications 455. For example, the resource identifiers 202-1, 202-2, and 202-3 are duplicates, which the convergence manager 160 finds via inspecting the resource identifier field 450 in records 405, 420, and 435, respectively. The duplicate resource identifiers identify the same resource, which is managed by different applications 170 identified by the respective application identifiers 455. In various embodiments, the duplicate resource identifiers 450 may have duplicate or identical names but different domains, addresses, and/or serial numbers. In an embodiment, the degree of commonality that the resource convergence manager 160 requires in order to designate resource identifiers as being duplicates, even though not identical, is based on the convergence level 355 (FIG. 3B). For example, in an embodiment, for a convergence level 355 that is relatively low, the resource convergence manager 160 may require identical names, domains, addresses, and serial numbers in order to designate resource identifiers as duplicates. Similarly, for a convergence level 355 that is relatively high, the resource convergence manager 160 may require only identical names, but allow different domains, addresses, and serials numbers in order to designate resource identifiers as duplicates.

Control then continues to block 515 where the resource convergence manager 160 converges the found duplicate resource identifiers into a single converged interface object. For example, the resource convergence manager 160 converges the duplicate resource identifiers 202-1 (record 405 in FIG. 4), 202-2 (record 420 in FIG. 4), and 202-3 (record 435 in FIG. 4) into the converged interface object 254-1 (FIG. 2B) because the resource identifiers 202-1, 202-2, and 202-3 are duplicates in that they all refer to the same resource named "System A." The phrase "interface object" denominates a unit of information that is presented via an interface (e.g., the interfaces of FIGS. 2A and 2B) and does not necessarily imply how the information is packaged for presentation. For example, in various embodiments, different interface objects may packaged separately or together for presentation, such as in the same or different widgets. The resource convergence manager 160 presents the converged interface object for the resource identifiers, e.g., the converged interface objects 254-1, 254-2, or 254-3.

Control then continues to block 520 where the resource convergence manager 160 finds duplicate links in the drill-down data 460 associated with the duplicate resource identifiers 450, where the duplicate links originate from the different applications 170 identified by the different application identifiers 455. Examples of duplicate links are 204-1, 204-2, and 204-3 in FIG. 2A. The duplicate links provide information regarding the same resource or regarding a sub-resource of the same resource. The duplicate links may contain different addresses to different locations of the linked information (e.g., different addresses on different servers 132 associated with different applications 170), but still be duplicate links because they provide information regarding the duplicate resources or sub-resources. For example, the duplicate links 204-1, 204-2, and 204-3 are duplicates because they all link to information regarding "messages" on "System A" (the same sub-resource associated with the same resource), regardless of where the linked information happens to be located.

The resource convergence manager 160 further converges the duplicate links into a converged interface object, e.g., the converged interface object 256, which represents the duplicate links 204-1, 204-2, and 204-3. The resource convergence manager 160 further presents the converged interface object for the duplicate links, e.g., via the converged user interface 250 of FIG. 2B.

Control then continues to block 525 where, in response to selection of the converged task menu request 258, the resource convergence manager 160 finds duplicate task identifiers 465 associated with the duplicate resource identifiers 450. The duplicate task identifiers originate from the different applications 170 identified by the different application identifiers 455 and identify tasks performed by the different applications via the same resource. In an embodiment, the resource convergence manager 160 finds duplicate task identifiers by finding identical task identifiers 465. In another embodiment, the resource convergence manager 160 finds duplicate task identifiers based on the descriptions of the functions or operations performed by the task, as stated in the task meta-data 470. For example, if one task identifier is "collect inventory" while another task identifier is "read inventory," the resource convergence manager may use the task meta-data 470 for both tasks to discover that the functions of the tasks are the same, so the task identifiers are duplicates, even if the task identifiers are not identical. In an embodiment, the degree of commonality that the resource convergence manager 160 requires in order to designate task identifiers as being duplicates, even though not identical, is based on the convergence level 355, as previously described above with reference to FIG. 3B.

The resource convergence manager 160 further converges the duplicate task identifiers into a converged interface object, e.g., the converged interface object 260 or 262. The resource convergence manager 160 further presents the converged interface object for the duplicate task identifiers, e.g., via the converged task menu 260 in the user interface 250 of FIG. 2B.

Control then continues to block 530 where the resource convergence manager 160 determines and presents invocation options for the duplicate task identifiers associated with the different applications in response to selection of one of the task identifiers in the converged interface object. For example, the resource convergence manager 160 presents the invocation options 305, 310, and 315 (FIG. 3A) for the duplicate task identifier "collect inventory" in the converged interface object 262.

Control then continues to block 535 where the resource convergence manager 160 determines status identifiers associated with the duplicate resource identifiers. The resource convergence manager 160 further determines a most critical (or most important) status identifier from among the status identifiers. The resource convergence manager 160 further presents the most critical status identifier. For example, the resource convergence manager 160 presents the most critical status identifier 268 (FIG. 2B).

Control then continues to block 540 where, in response to the convergence, the resource convergence manager 160 presents an indication that the convergence has occurred and, in response to an optional request (e.g., initiated via the unconverge button 270 in FIG. 2B), separates some or all of the converged interface objects into the duplicate resource identifiers, the duplicate links, and/or the duplicate task identifiers. In an embodiment, the indication that convergence has occurred may indicate that the entire user interface has converged, e.g., via the title "Converged Resource View" of the user interface 250 (FIG. 2B). In another embodiment, the indication that convergence has occurred may apply to only one or some of the converged interface objects, e.g., the converged interface objects 254-1, 254-2, 254-3, 260, and/or 262 may be in reverse video, may be presented in a different color from the some or all of the rest of the user interface 250, may have an icon associated with them, or via any other appropriate technique. Control then continues to block 599 where the logic of FIG. 5 returns.

Although the functions of the blocks of FIG. 5 have been described in an order, in other embodiments any appropriate order may be used. Further, in various embodiments, some of the functions of the blocks of FIG. 5 may be optional, not present, or not used.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:

in response to a converge selection, finding, by a manager, a plurality of duplicate resource identifiers that originate from different applications, wherein the plurality of duplicate resource identifiers are displayed in a user interface on a display device, wherein the plurality of duplicate resource identifiers identify a same resource and wherein the different applications manage the same resource, wherein the finding the plurality of duplicate resource identifiers further comprises finding the plurality of duplicate resource identifiers based on a convergence level option, wherein a first convergence level of the convergence level option requires that the plurality of duplicate resource identifiers comprise identical names and identical domains, and wherein a second convergence level of the convergence level option requires that the plurality of duplicate resource identifiers comprise the identical domains and allows different domains;

finding, by the manager, a plurality of duplicate links associated with the plurality of duplicate resource identifiers, wherein the plurality of duplicate links originate from the different applications, and wherein drill-down data of the plurality of duplicate resource identifiers comprise the plurality of duplicate links, and wherein the plurality of duplicate links comprise addresses of plurality of linked information regarding a same sub-resource of the same resource;

converging, by the manager, the plurality of duplicate resource identifiers into a first converged interface object that represents the plurality of duplicate resource identifiers;

converging, by the manager, the plurality of duplicate links into a second converged interface object that represents the plurality of duplicate links;

presenting, by the manager, the first converged interface object;

in response to selection of the first converged interface object, presenting, by the manager, the second converged interface object; and in response to selection of the second converged interface object, prompting, by the manager, a user to choose only one of the plurality of duplicate links represented by the second converged interface object and retrieving only one of the plurality of linked information for the only one of the plurality of duplicate links chosen by the user.

2. The method of claim 1, further comprising:

finding duplicate task identifiers associated with the duplicate resource identifiers, wherein the duplicate task identifiers originate from the different applications; and converging the duplicate task identifiers into a third converged interface object.

3. The method of claim 2, wherein the duplicate task identifiers identify tasks performed by the different applications via the same resource.

4. The method of claim 3, further comprising:

presenting invocation options for the different applications in response to selection of the third converged interface object.

5. The method of claim 1, further comprising:

determining a plurality of status identifiers associated with the plurality of duplicate resource identifiers;

determining a most critical status identifier from among the plurality of status identifiers; and presenting the most critical status identifier.

6. The method of claim 1, further comprising:

presenting an indication that the converging has occurred; and separating the first converged interface object into the plurality of duplicate resource identifiers.

7. A computer-readable storage medium encoded with instructions, wherein the instructions when executed comprise:

in response to a converge selection, finding by a manager, a plurality of duplicate resource identifiers that originate from different applications, wherein the plurality of duplicate resource identifiers are displayed in a user interface on a display device, wherein the plurality of duplicate resource identifiers identify a same resource and wherein the different applications manage the same resource, wherein the finding further comprises finding the plurality of duplicate resource identifiers based on a convergence level option, wherein a first convergence level of the convergence level option requires that the plurality of duplicate resource identifiers comprise identical names and identical domains, and wherein a second convergence level of the convergence level option requires that the plurality of duplicate resource identifiers comprise the identical domains and allows different domains;

finding, by the manager, a plurality of duplicate links associated with the plurality of duplicate resource identifiers, wherein the plurality of duplicate links originate from the different applications, and wherein drill-down data of the plurality of duplicate resource identifiers comprise the plurality of duplicate links and wherein the plurality of duplicate links comprise addresses of a plurality of linked information regarding a same sub-resource of the same resource;

converging, by the manager, the plurality of duplicate resource identifiers into a first converged interface object that represents the plurality of duplicate resource identifiers;

converging, by the manager, the plurality of duplicate links into a second converged interface object that represents the plurality of duplicate links;

presenting, by the manager, the first converged interface object;

in response to selection of the first converged interface object, presenting, by the manager, the second converged interface object; and in response to selection of the second converged interface object, prompting, by the manager, a user to choose only one of the plurality of duplicate links represented by the second converged interface object and retrieving only one of the plurality of linked information for the only one of the plurality of duplicate links chosen by the user.

8. The computer-readable storage medium of claim 7, further comprising:

finding duplicate task identifiers associated with the duplicate resource identifiers, wherein the duplicate task identifiers originate from the different applications, and wherein the duplicate task identifiers identify tasks performed by the different applications via the same resource; and converging the duplicate task identifiers into a third converged interface object.

9. An apparatus comprising a processor operatively connected to the computer-readable storage medium of claim 7.

10. A method for configuring a computer, comprising:

configuring the computer to, in response to a converge selection, find, by a manager, a plurality of duplicate resource identifiers that originate from different applications, wherein the duplicate resource identifiers identify a same resource and wherein the different applications manage the same resource, wherein the plurality of duplicate resource identifiers are displayed in a user interface on a display device, wherein the configuring the computer to find the plurality of duplicate resource identifiers further comprises configuring the computer to find the plurality of duplicate resource identifiers based on a convergence level option, wherein a first convergence level of the convergence level option requires that the plurality of duplicate resource identifiers comprise identical names and identical domains, and wherein a second convergence level of the convergence level option requires that the plurality of duplicate resource identifiers comprise the identical domains and allows different domains;

configuring the computer to find, by the manager, a plurality of duplicate links associated with the plurality of duplicate resource identifiers, wherein the plurality of duplicate links originate from the different applications, and wherein drill-down data of the plurality of duplicate resource identifiers comprise the plurality of duplicate links, and wherein the plurality of duplicate links comprise addresses of a plurality of linked information regarding a same sub-resource of the same resource;

configuring the computer to converge, by the manager, the plurality of duplicate resource identifiers into a first converged interface object that represents the plurality of duplicate resource identifiers;

configuring the computer to converge, by the manager, the plurality of duplicate links into a second converged interface object that represents the plurality of duplicate links;

configuring the computer to present, by the manager, the first converged interface object;

configuring the computer to, in response to selection of the first converged interface object, present, by the manager, the second converged interface object; and configuring the computer to, in response to selection of the second converged interface object, prompt, by the manager, a user to choose only one of the plurality of duplicate links represented by the second converged interface object and retrieving only one of the plurality of linked information for the only one of the plurality of duplicate links chosen by the user.

11. The method of claim 10, further comprising:

configuring the computer to find duplicate task identifiers associated with the duplicate resource identifiers, wherein the duplicate task identifiers originate from the different applications, and wherein the duplicate task identifiers identify tasks performed by the different applications via the same resource; and configuring the computer to converge the duplicate task identifiers into a third converged interface object.

12. The method of claim 11, further comprising:

configuring the computer to present invocation options for the different applications in response to selection of the third converged interface object.

13. The method of claim 10, further comprising:

configuring the computer to determine a plurality of status identifiers associated with the plurality of duplicate resource identifiers;

configuring the computer to determine a most critical status identifier from among the plurality of status identifiers; and configuring the computer to present the most critical status identifier.

14. The method of claim 10, further comprising:

configuring the computer to present an indication that the converging has occurred; and configuring the computer to separate the first converged interface object into the plurality of duplicate resource identifiers in response to a request.

\* \* \* \* \*